United States Patent [19]
Morimoto

[11] Patent Number: 5,205,511
[45] Date of Patent: Apr. 27, 1993

[54] CLUTCH MECHANISM FOR A DOUBLE BEARING FISHING REEL

[75] Inventor: Shinichi Morimoto, Sakai, Japan

[73] Assignee: Shimano, Inc., Osaka, Japan

[21] Appl. No.: 816,535

[22] Filed: Dec. 30, 1991

Related U.S. Application Data

[63] Continuation of Ser. No. 575,618, Aug. 31, 1990, abandoned.

[30] Foreign Application Priority Data

Oct. 16, 1989 [JP] Japan ................. 1-121378[U]

[51] Int. Cl.⁵ .................................................. A01K 89/015
[52] U.S. Cl. ............................................ 242/261; 192/108
[58] Field of Search ............... 242/257, 259, 260, 261, 242/262; 192/67 P, 108

[56] References Cited

U.S. PATENT DOCUMENTS

| | | | |
|---|---|---|---|
| 1,064,889 | 6/1913 | Deves | 192/108 |
| 1,163,085 | 12/1915 | Hardy | 192/108 |
| 1,351,486 | 8/1920 | Nunn | 192/108 |
| 1,475,350 | 11/1923 | Marvin | 192/108 |
| 2,690,310 | 9/1954 | Hayes | 242/260 |
| 2,923,951 | 2/1960 | Beavis | 192/108 |
| 3,226,052 | 12/1965 | King | 242/260 |
| 3,812,940 | 5/1974 | Svensson | 242/260 X |
| 4,142,694 | 3/1979 | Rankin, Jr. | 242/260 |
| 4,179,084 | 12/1979 | Noda | 242/261 |
| 4,579,296 | 4/1986 | Karlsson et al. | 242/261 |

FOREIGN PATENT DOCUMENTS 908130  4/1946  France .................. 192/108

*Primary Examiner*—Katherine Matecki
*Attorney, Agent, or Firm*—Dickstein, Shapiro & Morin

[57] ABSTRACT

A clutch mechanism for a double bearing fishing reel provided with a pair of driven members rotatable together with a spool and with a clutch cylinder having a pair of engaging recesses engageable with the driven members respectively, so that the clutch cylinder is provided at an end face where the engaging recesses are formed with sloping guide surfaces slanted with respect to the plane perpendicular to the axis of the spool from one side of one of the engaging recesses to the other side of the other of the engaging recesses.

3 Claims, 3 Drawing Sheets

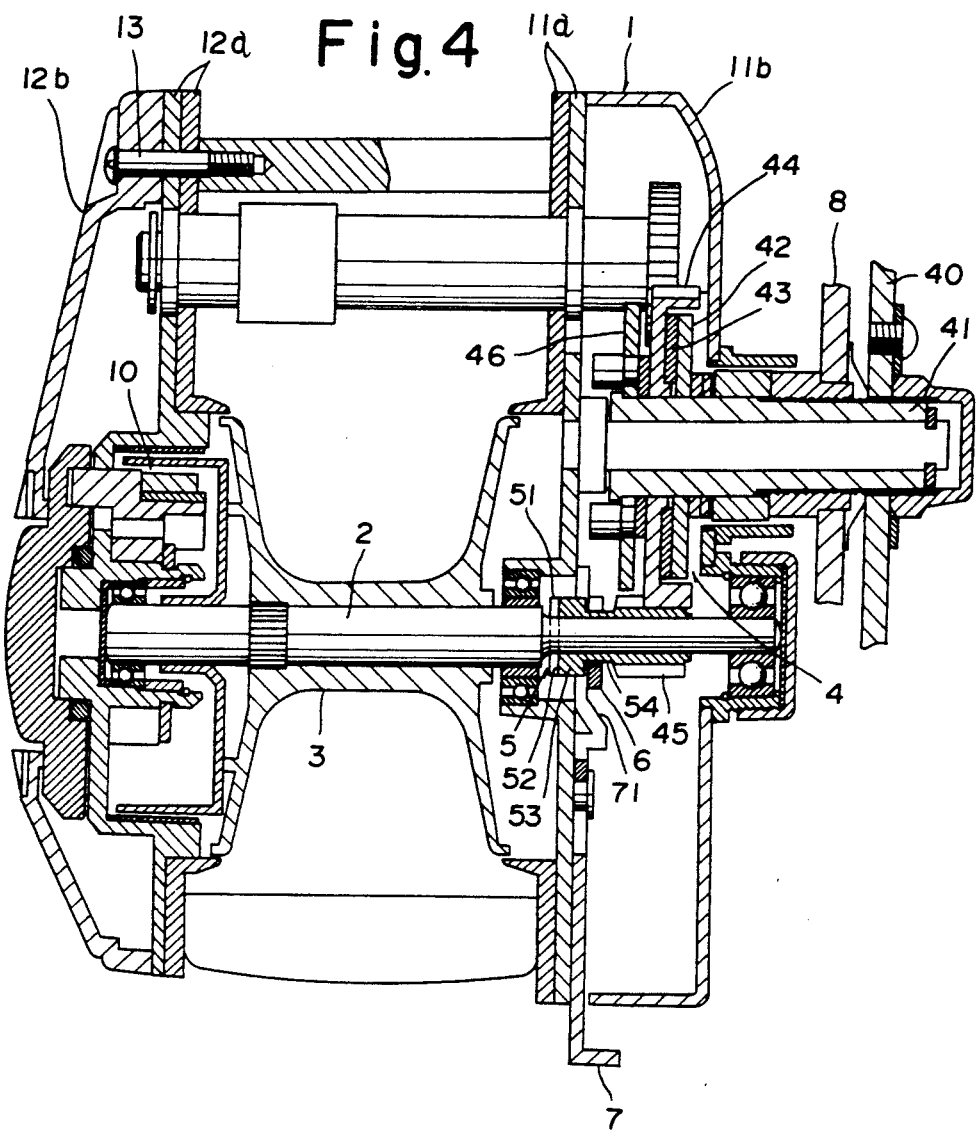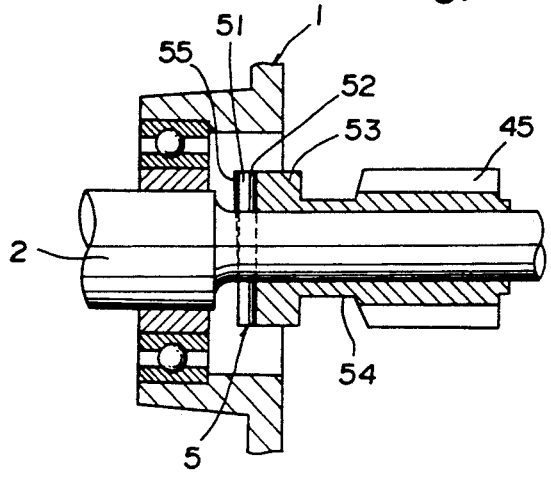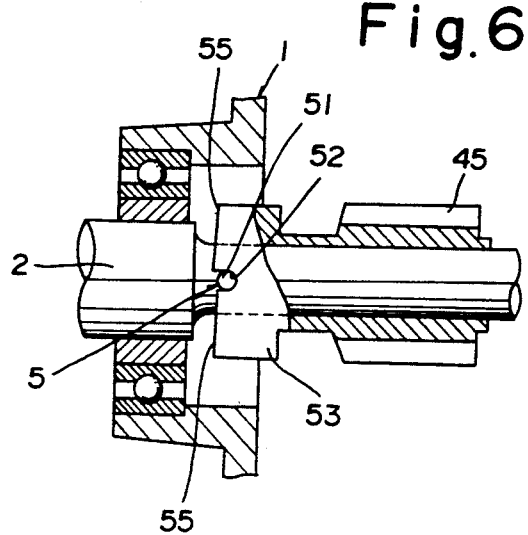

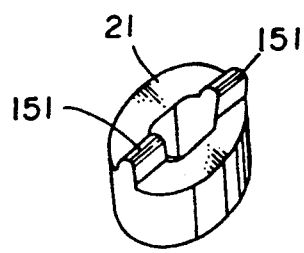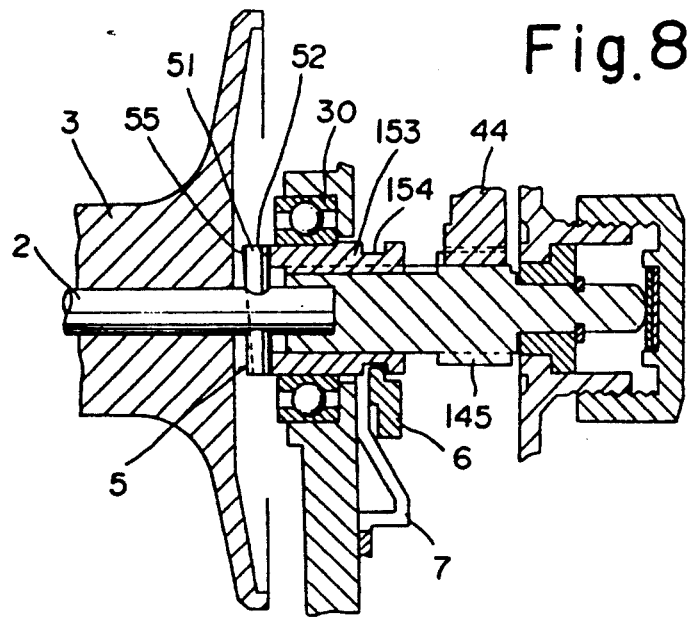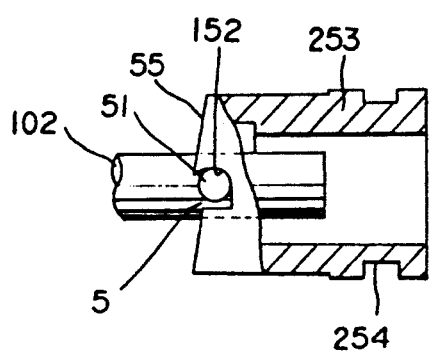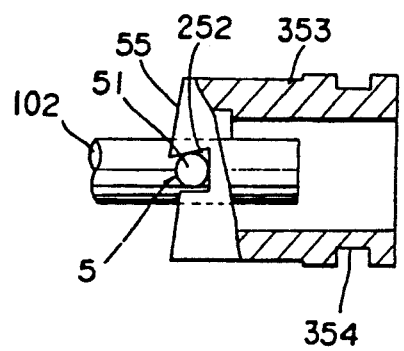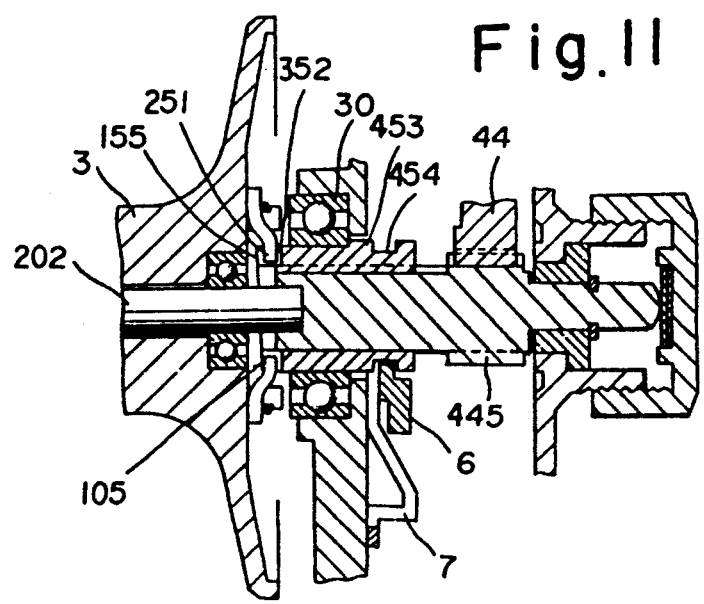

CLUTCH MECHANISM FOR A DOUBLE BEARING FISHING REEL

This application is a continuation of application Ser. No. 575,618 filed Aug. 31, 1990, and now abandoned.

FIELD OF THE INVENTION

The present invention relates to a clutch mechanism for a double bearing fishing reel, and more particularly to a clutch mechanism for a double bearing fishing reel provided with a spool journalled to a pair of side frames and a driving mechanism for driving the spool.

BACKGROUND OF THE INVENTION

Generally, the double bearing fishing reel is provided between the driving mechanism and the spool with the clutch mechanism for transmitting a driving force of the driving mechanism to the spool or cutting off the driving force, so that the clutch mechanism is disengaged to make the spool freely rotatable for casting a fishing line and engaged to drive the same to wind up thereon the cast fishing line.

The clutch mechanism comprises a pair of driven members rotatable together with the spool and composed mainly of a pin extending perpendicularly to the axis of spool and a clutch cylinder movable axially of the spool and having a pair of engaging recesses engageable with the driven members respectively.

The clutch mechanism, as disclosed in the Japanese Patent Publication Gazette No. Sho 50-213,925, is provided between a spool shaft for the spool and a pinion rotatably and axially movably supported to the spool shaft, and comprises two driven members of a clutch pin perforating the spool shaft and extending perpendicularly to the axis of the spool and a clutch cylinder integrally formed with one end of the pinion and having engaging recesses engageable with the driven members respectively.

The clutch cylinder is usually biased by a clutch yoke toward the driven members and moved away from the driven members through the clutch yoke operated by a clutch lever supported to the side frame, thereby disengaging the clutch. When the clutch is engaged, a handle at the driving mechanism is rotated to contact a return projection thereon with the fore end of clutch lever to thereby return the clutch lever, so that the clutch yoke restores the clutch cylinder, thereby engaging the driven members with the engaging recesses respectively.

In the clutch cylinder of the conventional clutch mechanism, the end face on which the engaging recesses are formed is perpendicularly to the axis of clutch cylinder. When the clutch cylinder moves to engage the clutch, upon abutting the driven members against the end face at the engaging recess side, the driven members do not immediately engage with the engaging recesses, but, after relative rotation of the spool shaft having the driven members to the clutch cylinder while abutting thereagainst, engage with the recesses respectively. During such the relative rotation, the clutch cylinder is subjected to a press-contact force by the clutch yoke, thereby creating the problem in that the handle is heavy to operate until the clutch engages.

In the state where a load is applied to the spool shaft, when the clutch cylinder is moved, the spool shaft is stationary due to the load, so that the relative rotation is caused between the spool shaft and the clutch cylinder, and the engaging recesses rotate to the position where they coincide with the driven members, thereby engaging with the driven members to engage the clutch. When the spool shaft is applied with no load, for example, when a user tries engagement of the clutch at a store for selling fishing-tackle, the driven members abut against the end face of clutch cylinder at the engaging recess side so as to rotate together with the clutch cylinder, whereby the clutch becomes hard to engage. As a result, the store-front effect lowers effectiveness of sales promotions. In the case where the clutch is engaged during the rotation of spool for use, for example, in casting, the inertia rotation of the spool may cause the relative rotation of spool shaft to the clutch cylinder while the driven members are not engaging with the engaging recesses, thereby creating the problem in that the corner of each engaging recess wears due to contact with the driven members so that the clutch cylinder reduces its life span.

SUMMARY OF THE INVENTION

In the light of the above problem, the present invention has been designed. An object of the invention is to provide a clutch mechanism for a double bearing fishing reel, which can reduce resistance caused when the spool side member provided with the driven members rotates relative to the clutch cylinder. Reduced resistance occurs in the state where the driven members abut against the end face of a clutch cylinder at the engaging recess side, thereby facilitating engagement of the clutch. Even when the clutch is engaged during the rotation of spool for casting, the invention can minimize the relative rotation of spool side member provided with the driven members to the clutch cylinder, and thereby solve the problem that the corner of each engaging recess wears, thus also improving the durability.

The present invention improves the clutch mechanism in the double bearing fishing reel provided with a spool journalled to the side frames of a reel and a driving mechanism for driving the spool. The invention is characterized by providing the following construction.

The clutch mechanism of the invention is provided with a pair of driven members rotatable together with the spool and extending perpendicularly to the axis of the spool; a clutch cylinder which has a pair of engaging recesses engageable with the driven members and is movable axially of the spool; and sloping guide surfaces provided at the end face of clutch cylinder on which the engaging recesses are formed and each sloping toward the driven member from the front side of one of the engaging recesses in the rotation direction of the driven clutch cylinder to the rear side of the other of the engaging recesses in the same direction.

Hence, from such construction, when the clutch cylinder is axially moved and the driven members engage with the engaging recesses to engage the clutch, the driven members abutting against the end face of clutch cylinder slidably rotate relative thereto in the direction of reducing contact resistance against the guide surfaces, resulting in the driven members sliding more smoothly with respect to the end face than in a conventional design, thereby enabling the driven members to quickly engage with the engaging recesses respectively.

Since the driven members rotate relative to the clutch cylinder with less resistance, even when no load is applied to the spool, the former can quickly engage with the clutch cylinder, thereby increasing effectiveness in store-front sales. Also, even when the clutch is engaged during the rotation of the spool for casting, the relative rotation of spool side member provided with the driven members to the clutch cylinder can be minimized so as to enable quick engagement therebetween, thereby restricting the wearing of the corner of each engaging recess and increasing the life span of the clutch cylinder.

The above and further objects and novel features of the invention will more fully appear from the following detailed description when the same is read in connection with the accompanying drawings.

BRIEF DESCRIPTION OF THE DRAWINGS

FIG. 4 is a sectional view of an entire double bearing fishing reel applying the clutch mechanism of the invention, FIG. 5 is a sectional view of the clutch mechanism in FIG. 4, FIG. 6 is a cross-sectional plan view of the clutch mechanism in FIG. 5, FIG. 7 is a perspective view of another example of a driven member, FIG. 8 is a sectional view of a modified embodiment of the clutch mechanism of the invention, corresponding to FIG. 5, FIG. 9 is a partially cutaway plan view of another modified embodiment of the clutch mechanism of the invention, FIG. 10 is a partially cutaway plan view of still another modified embodiment of the same, corresponding to FIG. 9, and FIG. 11 is a sectional view of yet another modified embodiment of the same, corresponding to FIGS. 5 and 8.

DETAILED DESCRIPTION OF THE INVENTION

Figure 1:
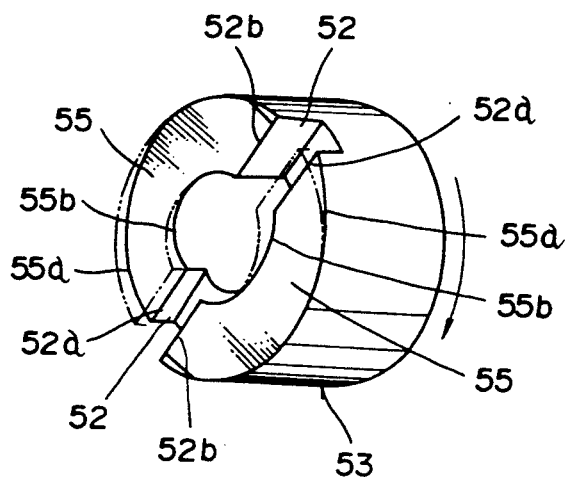
FIG. 1 is a perspective exemplary view of a clutch cylinder of the clutch mechanism of the invention.

Referring to FIG. 4, a double bearing fishing reel is illustrated. The fishing reel includes a reel body 1 provided with a first side frame 11 comprising a side plate 11a and a cup-like cover 11b attached to the outside thereof. A second side frame 12 is also provided comprising a side plate 12a and a cup-like cover 12b attached to the outside thereof. A plurality of connecting rods 13 for connecting the first and second side frames 11 and 12 are shown so that a spool 3 is rotatably supported between the side frames 11 and 12 through a spool shaft 2. A driving mechanism 4 for the reel includes a disc 42, a friction plate 43, a master gear 44, and a return plate 46, which are supported by a handle shaft 41, which is built in the first side frame 11. The driving mechanism also engages pinion 45 which extends from spool shaft 2. A clutch mechanism 5 is provided between the pinion 45 and the spool shaft 2. The clutch mechanism 5 comprises a pair of driven members 51 of a clutch pin extending perpendicularly to the axis of the spool 3 and a clutch cylinder 53 having a pair of engaging recesses 52 engageable with the driven members 51 respectively. An operating force of a handle 40 mounted to the handle shaft 41 is transmitted therefrom to the spool shaft 2 through the disc 42, friction plate 43, master gear 44, pinion 45 and clutch mechanism 5, thereby driving the spool 3.

In greater detail, the driven members 51 at the clutch mechanism 5 in FIG. 4 are formed mainly of the clutch pin round in section, perforating the spool shaft 2, and projecting at both ends therefrom. The clutch cylinder 53 is integrally formed with one axial end of the pinion 45. The pinion 45 is rotatably and axially movably supported to an extension of spool shaft 2 and adapted to axially move to engage or disengage the clutch. Between the clutch cylinder 53 and the pinion 45 is provided an annular groove 54 into which a clutch yoke 6, to be discussed below, is inserted. The clutch yoke 6 is supported on the side plate 11a in relation to being movable axially of the pinion 45 and biased by a spring (not shown) in the direction of engaging the engaging recesses 52 with the driven members 51 respectively. A cam portion 71, provided at an intermediate portion of a clutch lever 7, is brought into contact with the side surface of clutch yoke 6, the clutch lever 7 being pushed to move the clutch yoke 6 against the biasing spring and in the direction of disengaging the engaging recesses 52 from the driven members 51 and restored by the biasing spring to allow the engaging recesses 52 to engage with the driven member 51.

In addition, the clutch lever 7, as well-known, is furcate, has the cam portion 71, and is supported to the side plate 11a mainly through a guide pin in relation of being movable in reciprocation and swingable only in a predetermined range around the guide pin. Between the clutch lever 7 and the side plate 11a is interposed a return spring so that, when the clutch lever 7 moves forwardly, the utmost end thereof engages with a retaining portion provided at the side plate 11a, whereby the clutch lever 7 can be held at the termination of forward movement. The handle shaft 41 is rotated to allow one return projection provided at a return plate 46 to hit the utmost end of clutch lever 7, whereby the lever 7 swings around the guide pin to disengage from the retaining portion and is restored by the return spring.

The clutch mechanism 5 of the invention is provided at its end face where the engaging recesses 52 are formed with guide surfaces 55 each sloping from the front side edge 52a of one engaging recess 52 in the rotational direction of the driven clutch cylinder 53 to the rear side edge 52b of the other engaging recess 52 in the same direction and toward the driven members 51.

Accordingly, when the handle 40 is operated to thereby return the clutch lever 7 and engage the clutch 5 by the clutch yoke 6, the driven members 51, which even abut against the end face at the engaging recess side, rotate relative to the rotating clutch cylinder 53 in the direction of reducing contact resistance against each guide surface 55, thereby sliding therealong smoothly with less resistance so as to more quickly engage in the clutch than in the conventional design. As the result, when a user tries to engage or disengage the clutch at the store-front, the handle is not heavily operated even with a small load on the spool, whereby the clutch can quickly be operated to improve the store-front effect. The driven members 51 abutting at the projections against the end face of clutch cylinder 53 reliably engage with the engaging recesses 52 in at most a half rotation of clutch cylinder 53 respectively, so that, even during the rotation of spool 3, the driven members 51 can immediately engage with the engaging recesses 52 regardless of the inertia rotation of the spool. As the result, a edges of each engaging recess 52 are prevented from wearing and the clutch cylinder can increase its life span.

Figure 2:
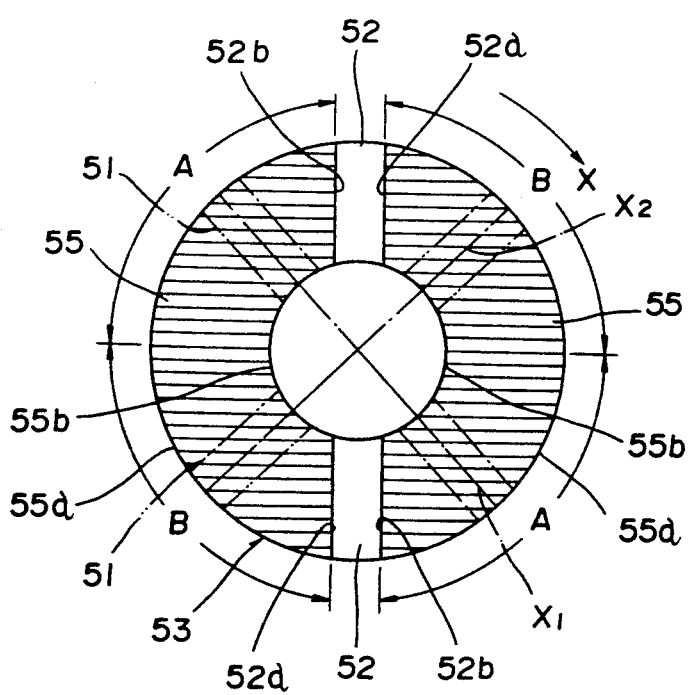
FIG. 2 is an enlarged side view of the clutch cylinder in FIG. 1.
Figure 3:
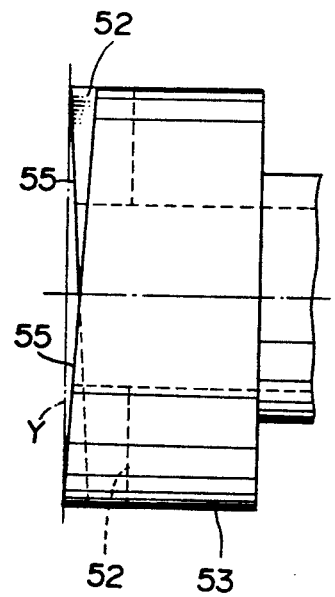
FIG. 3 is a front view of the view shown in FIG. 2.

The guide surfaces 55 may be cut to circumferentially slope, but is preferable to be formed of the plane slanted with respect to that perpendicular to the axis of clutch cylinder 53 as shown in the embodiment in FIGS. 1 through 3. In detail, in this embodiment, two semicircular end faces 55 of the clutch cylinder 53 at the engaging recess side each are cut to slope from the front side edge 52a of one engaging recess 52 to the rear side edge 52b of the other engaging recess 52 in the rotation direction X of clutch cylinder 53 with respect to the plane perpendicular to the axis of the clutch cylinder 53.

Thus, the projections at the driven members 51 can point-contact with the guide surfaces 55 respectively. In other words, as shown by a plurality of horizontal lines Z in FIG. 2, each line is lengthwise level and each guide surface 55 slopes from the front side edge 52a to the rear side edge 52b of the respective engaging recesses 52 in the rotation direction of clutch cylinder 53 in relation of sloping from the lower level away from each driven member 51 to the high level toward the same.

Accordingly, when the driven members 51 are positioned on, for example, the phantom line $X_1$ in FIG. 2, the level of guide surface 55 abutting against the driven member 51 is the lowest at the inner circumferential edge 55b and the highest at the outer circumferential edge 55a, whereby the projection of each driven member 51 point-contacts at the outer circumferential edge 55a.

The driven members 51 each continuously contact with the outer circumferential edge 55a during the movement of each driven member 51 in a first region A from the rear side edge 52b of the front engaging recess 52 in the rotation direction of clutch cylinder 53 to the circumferential center of each guide surface 55, that is, the position of each driven member 51 perpendicular to the lengthwise direction of each engaging recess 52.

When the driven members 51 move beyond the above-mentioned central position and are positioned on, for example, the phantom line $X_2$ in FIG. 2, each guide surface 55 is at the lowest level of the outer circumferential edge 55a and at the highest level of the inner circumferential edge 55b, resulting in that the driven members 51 point-contact with the inner circumferential edge 55b of the clutch cylinder 53 or guide surfaces 55.

Such point-contact of each driven member 51 with the inner circumferential edge 55b continues in a second region B where the driven member 51, following the rotation of clutch cylinder 53, moves from the above-mentioned central position to the front side edge 52a of the rear engaging recess 52 in the rotational direction of the clutch cylinder 53. As mentioned above, the driven members 51 only temporarily linearly contact with the central positions at the guide surfaces 55, but point-contact therewith at all the first and second regions A and B, whereby the driven members 51 slide with minimum resistance so as to quickly engage with the engaging recesses 52 respectively, and also the contact position of each driven member 51 with the guide surface 55 sequentially changes, thereby increasing the life spans of driven members 51 and clutch cylinder 53.

The low level side of guide surface 55, that is, the front side edge 52a of each engaging recess 52, is high to such an extent that the driven members 51 do not escape from the engaging recesses 52 due to inertia rotation of the spool shaft 2 rotatable together with the spool 3 when driven, in other words, depth of each recess 52 is larger than a radius of the pin forming the driven members 51. In other words, the spool 3, even when the handle stops during the rotations of spool, inertia-rotates, so that, if the lower side edge of recess 52 is low, the driven members 51 may ride over the recess 52 to escape therefrom. The low level side of each guide surface 55 is made high to some extent as the mentioned above, thereby preventing the driven members 51 from escaping from the engaging recesses 52.

In addition, in FIG. 4, reference numeral 8 designates a drag adjustor, 9 designates a cast control, and 10 designates a magnet brake housed in the second side frame 12.

Alternatively, a larger diameter portion is provided at the spool shaft 2 and the driven members are directly mounted to one end of the larger diameter portion. Or, as shown in FIG. 7, the driven members 151 may be integral with a larger diameter portion 21 separate from the spool shaft 2.

Alternatively, as shown in FIG. 8, a pinion 145 may be supported rotatably only to the first side frame 11, and a clutch cylinder 153 may be formed separately from the pinion 145 and slidably supported onto the pinion 145, in which the spool shaft 102 is rotatably supported at one end to the side plate 11 through the pinion 145, clutch cylinder 153 and a bearing 30. In the case shown in FIG. 8, since the clutch cylinder 153 is not subjected to an axially biasing force, when the engaging recesses 52 each are depthwise parallel to the axis of clutch cylinder 153, the clutch cylinder 153 may unintentionally axially move. Therefore, as shown in FIGS. 9 and 10, it is preferable that the rear side surface of each engaging recess 152, 252 in the rotation direction of the driven clutch cylinder 253, 353, that is, the side surface of each recess 152, 252 to transmit the driving force to the driven member 51, is inwardly curved or slanted from the open side of the recess 152, 252 toward the bottom thereof. Therefore, the clutch cylinder 253, 353, when driven to rotate, is subjected to the axial component of the driving force. As the result, the clutch cylinder 253, 353 is prevented from moving in the direction of axially escaping from the driven members 51. The clutch cylinders 153, 253, 353 each include an annular groove 154, 254, 354.

Alternatively, the spool 3 may be supported directly between the side frames 11 and 12 other than through the spool shaft 2.

Alternatively, the driven members 251 may be provided at one end of the spool 3 as shown in FIG. 11. The embodiment illustrated in FIG. 11 includes a clutch mechanism 105, guide surfaces 155, a spool shaft 202, engaging recesses 352, a pinion 445, a clutch cylinder 453, and an annular groove 454.

As seen from the above, at the clutch mechanism of the invention comprising a pair of driven members 51 extending perpendicularly to the axis of spool 3 and the clutch cylinder 53 having a pair of engaging recesses 52 engageable with the driven members 51, the sloping guide surfaces 55 constructed as the above-mentioned are provided. Hence, when the clutch is intended to engage, the driven members 51 abutting against the end surface of clutch cylinder 53 at the engaging recess side rotate relative to the sloping guide surfaces 55 in the direction of reducing resistance following the rotation of driven clutch cylinder 53, and slide with respect to the guide surfaces 55. As the result, the driven members 51 are easy to slide thereon to quickly engage with the engaging recesses 52, thereby enabling the clutch to be lightly and quickly engaged.

As a result, the user, when he tries to engage the clutch at the store for fishing tackle, can engage the clutch with light operation, thereby increasing the storefront effect. Even when the clutch engages during the rotation of the spool for casting, the relative rotation of the spool side member having the driven members 51 to the clutch cylinder 53 is minimized so as to quickly engage the driven members 51 with the engaging recesses 52, whereby the corner at the engaging recess 52 of clutch cylinder 53 can be prevented from wearing and also the clutch cylinder can increase its life span.

Although several embodiments have been described, they are merely exemplary of the invention and not to be constructed as limiting, the invention being defined solely by the appended claims.

What is claimed is:

1. A clutch mechanism for a double bearing fishing reel provided with a rotatable spool and a driving mechanism for driving said spool, said clutch mechanism comprising:

first and second driven clutch pins rotatable together with said spool and extending perpendicularly to the axis of said spool, each of said driven clutch pins having a round cross section; and a rotatable clutch cylinder which is movable axially of said spool, said clutch cylinder comprising:

first and second engaging recesses engageable with said first and second driven clutch pins, respectively, each of said engaging recesses having a bottom surface, first and second upper edges, and first and second side surfaces which extend from said bottom surface to said first and second upper edges, respectively, the distance from said second upper edge to said bottom surface being greater than the distance from said first upper edge to said bottom surface, and the distance from said first upper edge to said bottom surface being greater than the radius of said round cross section of said clutch pins; and first and second sloping planar guide surfaces extending from said second upper edges to said first upper edges of said engaging recesses, respectively, each of said sloping guide surfaces being located within a plane which is slanted with respect to a plane which is perpendicular to the axis of said spool, such that said clutch pins make point contact with said sloping guide surfaces, and such that said clutch pins are guided by said guide surfaces from said second upper edges to said first upper edges and then into said engaging recesses when said driving mechanism is operated in a direction for driving said spool.

2. A clutch mechanism for a double bearing fishing reel according to claim 1, wherein the second side surfaces of said engaging recesses are slanted from said second upper edges away from said first side surfaces.

3. A clutch mechanism for a double bearing fishing reel according to claim 1, wherein the second side surfaces of said engaging recesses are curved.

* * * * *